United States Patent [19]

Kaufman et al.

[11] 4,385,224
[45] May 24, 1983

[54] INTERNAL HEATED DIFFERENTIAL TEMPERATURE ROLL

[75] Inventors: William C. Kaufman; David R. Roland, Winneconne, both of Wis.

[73] Assignee: Kimberly-Clark Corporation, Neenah, Wis.

[21] Appl. No.: 249,731

[22] Filed: Mar. 31, 1981

[51] Int. Cl.³ .............................................. H05B 3/02
[52] U.S. Cl. .................................. 219/469; 156/164; 156/495; 219/388
[58] Field of Search ............... 219/244, 388, 469, 470, 219/471, 535; 156/164, 229, 287, 494, 495; 128/287, 290 R

[56] References Cited

U.S. PATENT DOCUMENTS

| | | | |
|---|---|---|---|
| 2,739,218 | 3/1956 | Wormerlund | 219/469 |
| 3,211,893 | 10/1965 | Barlow et al. | 219/469 |
| 3,423,573 | 1/1969 | Richards et al. | 219/469 |
| 4,005,302 | 1/1977 | Graf et al. | 219/469 X |
| 4,013,871 | 3/1977 | Namiki et al. | 219/471 |
| 4,081,301 | 3/1978 | Buell | 156/164 |
| 4,300,967 | 11/1981 | Sigl | 156/164 |

Primary Examiner—Volodymyr Y. Mayewsky
Attorney, Agent, or Firm—Leydig, Voit, Osann, Mayer & Holt, Ltd.

[57] ABSTRACT

A heat treating roll for heating selected spaced areas of stretched thermoplastic elastomeric material so as to "kill" the elastic properties of the heat treated areas wherein insulated arcuate shoes are disposed in grooves in the roll with an air space between the shoes and the bottoms of the grooves and with the outer surface of the shoes disposed radially outward from the ungrooved surface of the roll so that the insulated shoes are pressed by companion chill roll while the heated surfaces of the roll are not and the elastic material is transferred from the nip between the heated roll and the chill roll to stabilize the elastic/inelastic properties of the heat treated elastomeric ribbons.

8 Claims, 3 Drawing Figures

Fig. 1.

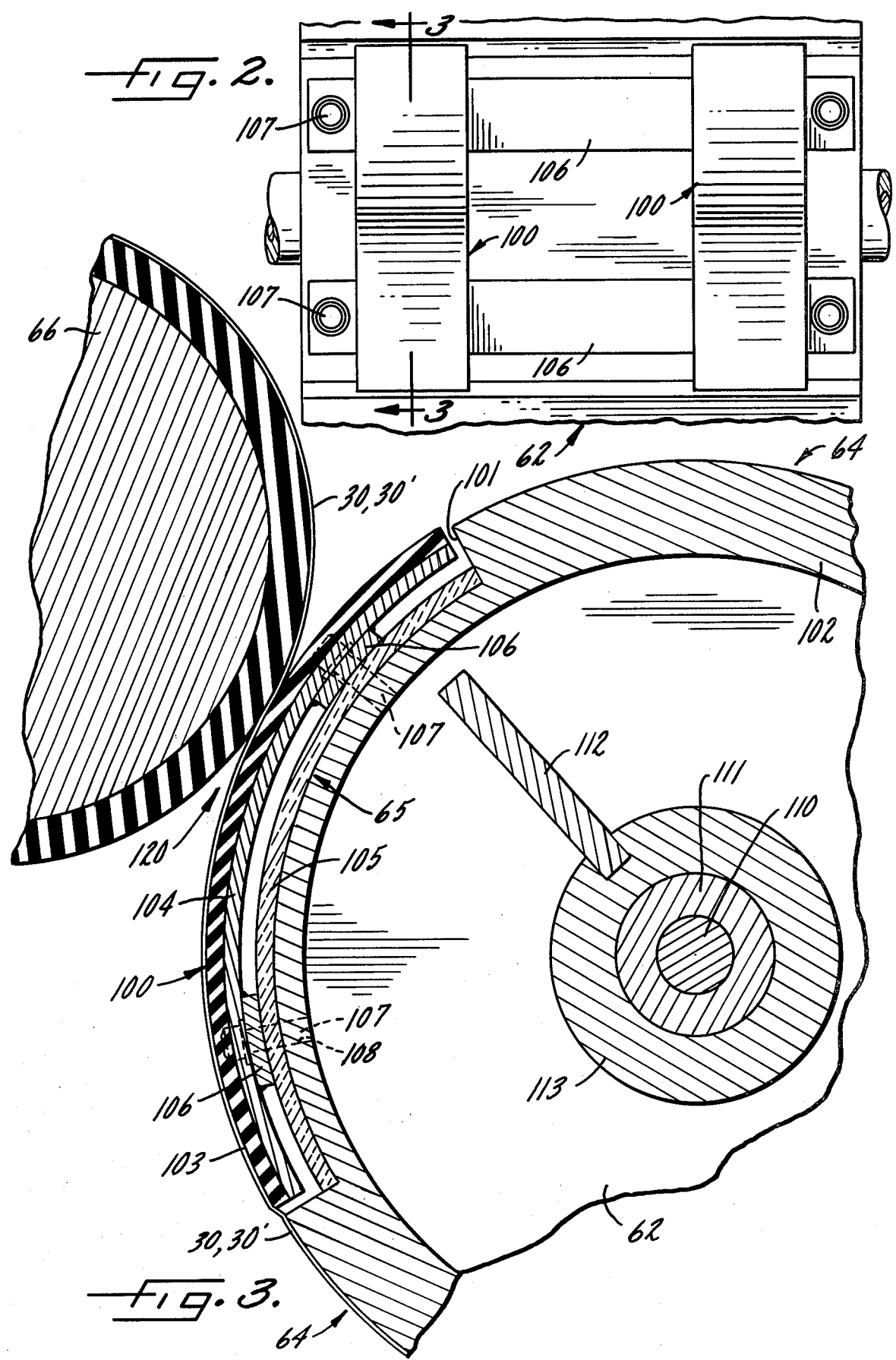

INTERNAL HEATED DIFFERENTIAL TEMPERATURE ROLL

RELATED APPLICATION

This application is an improvement on the method and apparatus disclosed in copending Sigl U.S. application Ser. No. 94,421, filed Nov. 15, 1979, now U.S. Pat. No. 4,300,967, which is incorporated herein by reference.

BACKGROUND OF THE INVENTION

The present invention relates in general to methods and apparatus for forming conformable garments such as diapers having selected discrete elasticized areas on a high speed production basis; and, more particularly to an improved heat roll for heat treating selected spaced areas of stretched thermoplastic elastomeric material so as to "kill" the elastic properties of the heat treated zones.

The general arrangement for "heat-killing" selected areas of elastomeric ribbons employing a driven roll having a peripheral surface defining alternate heated zones and relatively cool zones is disclosed in the above-mentioned copending application Ser. No. 94,421. As disclosed therein, the heated roll is provided with a pair of opposed arcuate grooves which receive arcuate insulating strips defining the non-heated zones and a chill roll is disposed to make contact with the entire circumferential surface of the heated roll. While this arrangement has been generally satisfactory under initial start-up conditions and at moderate production speeds, the heat in the "heat-kill" roll still tends to migrate from the heated to the non-heated zones, and the chill roll tends to cool the heated as well as the non-heated zones on the heated roll.

Accordingly, it is the primary aim of the present invention to provide a "heat-kill" roll wherein the non-heated zones are more effectively isolated from the heated zones and only the non-heated zones are cooled by engagement with one or more chill rolls.

It is a more particular object of the invention to provide such a "heat-kill" roll wherein the non-heated zones along substantially their entire arcuate length are separated from the heated zones by an insulating air space.

A further object is to locate the non-heated zones at a slightly greater radial distance from the roll axis than the heated zones so that only the non-heated zones engage a companion chill roll.

DESCRIPTION OF THE INVENTION

These and other objects and advantages of the present invention will become more readily apparent upon reading the following detailed description and upon reference to the attached drawings, in which:

FIG. 1 is a side elevational view, partly in section and partly in diagrammatic form, illustrating a high speed apparatus employing the improved "heat-kill" roll of the present invention;

FIG. 2 is a fragmentary, planar face view of the non-heated zones of the "heat-kill" roll; and FIG. 3 is an enlarged fragmentary cross section of the "heat-kill" roll and the companion chill roll substantially as seen along line 3—3 in FIG. 2.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
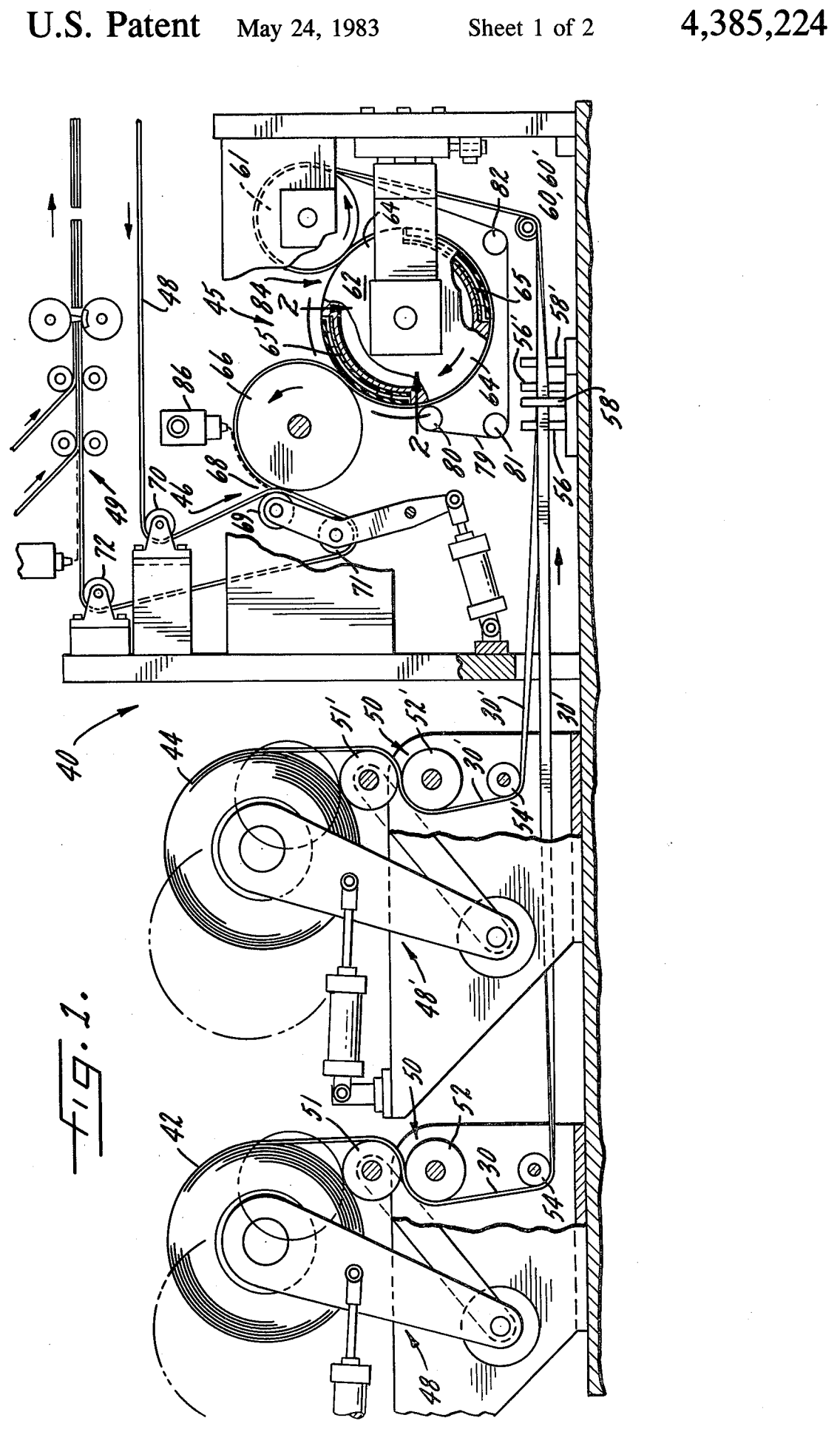

Turning now to the drawings, there is shown in FIG. 1 an illustrative apparatus 40 including the improved "heat-kill" roll 62 of the present invention for heat treating selected spaced areas of stretched thermoplastic elastomeric material such as, for example, TUFTANE ® manufactured by B.F. Goodrich General Products Company, Akron, Oh. As shown here, two separate ribbons 30 and 30' are drawn off supply rolls 42 and 44 by suitable unwind equipment, indicated generally at 48 and 48'. Basically, each unwind stand 48 (and 48') includes a pull-off nip 50 formed between an idler roller 51 which is urged by gravity and the weight of the supply roll against a driven roller 52. Further details of the unwind mechanisms and the idler rolls 54, guides 56, 58 and tension sensing rolls 60 and 60' are disclosed in the aforementioned Sigl application Ser. No. 94,421.

From the tensioning devices 60 and 60', the elastomeric ribbons 30, 30' are fed through a selective heat treating zone, generally indicated at 45, and then to an area, generally indicated at 46, where the ribbons 30, 30' are affixed to a continuous web 48 moving at a speed, for example sufficient to produce in excess of 250 diapers per minute. The web 48 may be fed from any suitable conventional source (not shown) to and through the area 46 where the elastomeric ribbons 30, 30' are affixed; and to further web processing stations, generally indicated at 49, where the composite web and elastomeric ribbons may be assembled with a series of absorbent batts and a continuous web defining interconnected fluid permeable facing sheets suitable for forming a plurality of disposable diapers when the webs are cut transversely.

In order to "kill" the elastic properties of the elastomeric ribbons 30, 30' in selected, spaced discrete areas in accordance with the present invention, the ribbons 30, 30' are fed in parallel about a suitable roll 61 and about the periphery of a driven roll 62 having a peripheral surface defining alternate heated zones 64 and non-heated zones 65. Thus, the driven roll 62 defines a high speed moving surface having a pair of heated "kill" zones 64 alternating with a pair of unheated "no-kill" zones 65. The ribbons 30, 30' are in intimate face-to-face contact with the roll 62 throughout approximately 270 degrees of the surface of the roll. In order to ensure that there is no relative slippage between the driven roll 62 and the ribbons 30, 30', the unheated zones 65 are preferably formed of an inherently non-slip material such, for example, as soft silicone foam rubber. Immobilization of the ribbons 30, 30' relative to the driven roll 62 is essential in order to ensure that the alternate areas of the ribbons 30, 30', do not slip as a result of the elastic properties which are retained in those areas of the ribbons overlying the unheated "no-kill" zones 65.

Following selective heat treatment of spaced discrete areas of the immobilized elastic ribbons 30, 30', the ribbons are transferred to a take-off roll 66 which also serves as a chill roll. To insure that the ribbons 30, 30' remain immobilized until bonded to the continuous web 48, the take-off or chill roll 66 may be provided with a high-friction, non-slip surface such, for example, as a surface formed of soft silicone foam rubber. The chill roll 66 serves to prevent heat build-up in the unheated zones 65 of roll 62, to cool the heat treated portions of the ribbons 30, 30', and to prevent or minimize heat transfer to those portions of the system used to convey the continuous web 48. One or more fine beads of adhesive are preferably applied to the exposed surfaces of the ribbons 30, 30' as they are carried about roll 66 in immobilized fashion by a suitable adhesive applying means 86. After application of adhesive thereto, the still immobilized ribbons enter a nip 68 defined by roll 66 and an idler roll 69.

To permit adhesive bonding of the ribbons 30, 30' to the continuous web 48, the web is passed around idler roll 70, through the nip 68 defined by idler roll 69 and roll 66, and then around idler rolls 71, 72. As the web 48 enters the nip 68, it comes into contact with the adhesively coated immobilized ribbons 30, 30', which are carried by roll 66 and is securely bonded thereto by pressure applied by idler roll 69. As a consequence, the web 48 and elastic ribbons 30, 30' together with their alternating heat treated non-elastic portions 31, 31' exit from the idler rolls 69, 71 and are transported as a composite unit with the elastic portions 30, 30' still fully extended about the idler rolls 71 and 72 for further processing on the production lines, such as disclosed in the aforementioned Sigl application Ser. No. 94,421.

In the preferred form of the invention illustrated in FIG. 1, provision is made for further insuring that the ribbons 30, 30' are maintained immobilized relative to the roll 62 during the selective "heat-kill" process. To accomplish this, a pair of spaced apart endless nip belts 79 are trained about roll 61, about approximately 220 degrees of the peripheral surface of roll 62, and about a series of idler rolls 80, 81 and 82. The arrangement is such that the ribbons 30, 30' pass over nip belts 79 as they pass around roll 61 and enter the nip 84 between the nip belts 79 and roll 62. Consequently, the nip belts 79 serve to hold the ribbons 30, 30' snugly against the peripheral surface of the roll 62 and thereby assist in immobilizing the ribbons 30, 30' relative to the surface of roll 62. It has been found that the use of such nip belts 79 to assist in immobilizing the ribbons relative to the selective "heat-kill" surface is highly beneficial when working at relatively high speed operation with a roll 62 which, as here, is on the order of 11.14" in diameter. However, such nip belts may not be necessary when operating with smaller rolls 62.

In the preferred embodiment, the non-heated zones 65 are formed of arcuate insulating shoes, generally indicated at 100, mounted diammetrically in arcuate grooves 101 machined in the outer shell 102 of the roll 62. As best seen in FIGS. 2 and 3, each insulating shoe 100 includes an outer arcuate insulating surface 103 and an inner reinforcing backing member 104. The insulating surface 103 may be formed of silicone impregnated rubber, for example, and the reinforcing member 104 may be formed of metal, such as mild steel.

Pursuant to the present invention, the arcuate insulating shoes 100 are spaced radially outward from the bottom of the arcuate grooves 101 in the shell 102 to form an insulating air space therebetween. Preferably, the bottoms of the arcuate grooves 101 are also faced with an arcuate layer of insulating material 105 such as a sheet of polytetrafluoroethylene material which extends the full axial extent of the grooves 101 in the drum 62. The arcuate insulating shoes 100, which may be on the order of 1" to 2" in width, are secured to the roll 62 by mounting straps 106 welded to the reinforcing members 104 and cap screws 107 surrounded by insulating bushings 108 which are received in tapped recesses in the steel shell 102 outboard of the arcuate shoes 100.

To heat the roll 62, a heated fluid, such as oil, may be circulated in the interior thereof to heat the steel shell 102. In the illustrated embodiment, the fluid is heated by an axial heating element 110 which is surrounded by a heater core 111. The heating element 110 may be electrically energized and the heater core may be any heat conductive material such as, for example, aluminum.

To prevent stratification of the heated fluid medium within the shell 102, means for preferably provided to increase the turbulance of the fluid medium. In the illustrated embodiment, this is accomplished by one or more stationary vanes 112 which project radially outwardly from stationary hub members 113 within the drum 62. As will be appreciated, the vanes 112 serve to mix the fluid medium and cause the inner heated portion thereof adjacent the core 111 to impinge against the shell 102. Other internal circulating or mixing devices could also be used.

In accordance with another aspect of the present invention, the outer surfaces of the arcuate insulating shoes 100 are located radially outwardly from the outer surface of the heated portions of the shell 102. Additionally, one or more chill rolls such as chill rolls 66 are disposed to press against the outer arcuate insulating surfaces 103 but not against the ungrooved surface of the drum 62. Thus the chill roll 66 serves to maintain the non-heated characteristic of the insulating shoes 100 while not dissipating heat away from the heated zones 64 of the roll 62.

Additionally, the elastomeric ribbons 30, 30' are pulled over the heated 64 and non-heated 65 zones of the roll 62 and into a nip 120 between the chill roll 66 and the heated roll 62. The heated zones 64 substantially "kill" the elastomeric properties of the ribbons 30, 30' while the elastic properties of the ribbons 30, 30' are substantially unaffected where they contact the unheated zones 65. Furthermore, nipping the unheated areas of the ribbons 30, 30' with the chill roll 66 against the insulating shoes 100 insures that a minimum of temperature increase occurs in these areas and the heated areas of the ribbons 30, 30' are also quickly chilled by being transferred to the chill roll 66 to stabilize their substantially non-elastic condition.

From the foregoing, it will be seen that an improved heat treating drum and chill roll have been provided for effectively "heat-killing" selected areas of a thermoplastic elastomeric material while not substantially adversely affecting the elastic properties of the intervening areas of the material.

We claim as our invention:

1. An improved heat treating roll for heat treating selected spaced areas of stretched thermoplastic elastomeric material so as to "kill" the elastic properties of the heat treated areas, comprising, in combination, a metal drum driven for rotation by suitable drive means, said drum having a relatively thick outer shell, means for heating the internal surface of said shell, means defining at least one arcuate groove in the outer periphery of said shell, an arcuate insulating shoe dimensioned to be received in said groove, said shoe including an outer insulating surface and an inner reinforcing backing member, and means for securing said arcuate insulating shoe to said shell in radially spaced relation from the bottom of said arcuate groove, and an arcuate layer of insulating material being secured to the bottom of said arcuate groove and said arcuate insulating shoe being radially spaced from said insulating layer by an insulating air space.

2. A heat treating roll as defined in claim 1 wherein said drum is machined of mild steel, said insulating layer is made of a polytetrafluoroethylene material, said backing member is a metallic material and said arcuate insulating surface is formed of a silicone impregnated rubber material.

3. A heat treating roll as defined in claim 1 wherein the outer surface of said insulating surface is spaced radially outward of the ungrooved outer surface of said shell so that a companion chill roll will press against the outer surface of said insulating surface but not against the ungrooved outer surface of said shell.

4. A heat treating roll as defined in claim 3 wherein at least one strip of thermoplastic elastomeric material is pulled around said roll in registry with said respective insulating surface so that as said elastomeric material is pulled into the nip formed by said chill roll and said heat treating roller it is transferred onto the surface of said chill roll.

5. A heat treating roll as defined in claim 4 including two pairs of laterally spaced insulating shoes with the shoes of each pair diametrically opposed to one another so that two laterally spaced strips of elastomeric material may be pulled around said roll in registry with said respective laterally spaced insulating surfaces.

6. The heat treating roll as defined in claim 1 wherein said metal drum is heated by a heated fluid medium in the interior of said drum.

7. A heat treating roll as defined in claim 6 wherein said fluid medium is heated by an internal heating element disposed axially within said drum.

8. A heat treating roll as defined in claim 6 including means within said drum to prevent the stratification of said heated fluid medium.

* * * * *